US012705249B1

(12) United States Patent
Tsang et al.

(10) Patent No.: US 12,705,249 B1
(45) **Date of Patent: *Aug. 11, 2026**

(54) SYSTEMS AND METHODS FOR ENTITY RESOLUTION

(71) Applicant: Experian Information Solutions, Inc., Costa Mesa, CA (US)

(72) Inventors: Alan Tsang, San Diego, CA (US); Zehua Guo, San Diego, CA (US); Derek John Toub, San Diego, CA (US); Mustafa Yakub Adib, San Diego, CA (US); Yue Yu, San Diego, CA (US); Shervin Sharifi, San Diego, CA (US); Christer Dichiara, Carlsbad, CA (US); Hua Li, San Diego, CA (US); Wis Kojohnjaratkul, San Diego, CA (US); Stuart Anthony Mathews, Tustin, CA (US)

(73) Assignee: Experian Information Solutions, Inc., Costa Mesa, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,077

(22) Filed: Dec. 12, 2023

Related U.S. Application Data

(63) Continuation of application No. 17/703,909, filed on Mar. 24, 2022, now Pat. No. 11,880,377.

(60) Provisional application No. 63/166,841, filed on Mar. 26, 2021.

(51) Int. Cl.

| | |
|---|---|
| *G06F 7/00* | (2006.01) |
| *G06F 16/2458* | (2019.01) |

(52) U.S. Cl.
CPC ................................ *G06F 16/2468* (2019.01)

(58) Field of Classification Search
CPC .... G06F 16/245; G06F 16/288; G06F 16/285; G06F 16/9535; G06F 16/27; G06F 16/248; G06F 16/337; G06F 16/24573; G06F 16/9014; G06F 16/2468; G06F 16/90344; G06F 16/2365; G06F 16/258; G06F 9/54; G06Q 40/03
See application file for complete search history.

(56) References Cited

U.S. PATENT DOCUMENTS

| | | | | |
|---|---|---|---|---|
| 11,061,874 | B1 * | 7/2021 | Funk | G06F 16/2468 |
| 2018/0121520 | A1 * | 5/2018 | Degiere | H04L 51/04 |
| 2018/0181646 | A1 * | 6/2018 | Balasa | G06F 16/288 |

* cited by examiner

*Primary Examiner* — Mohammad A Sana
(74) *Attorney, Agent, or Firm* — Knobbe, Martens, Olson & Bear, LLP

(57) ABSTRACT

Systems and methods are described for identifying a target entity that a user intends to refer to based on input that may include only a partial name of the entity. A system may receive a user's entity search query, which may include a partial entity name, then may determine initial candidate matching entities and associated name match scores for each of the initial candidate matching entities relative to the input string, such as using string matching or fuzzy matching techniques. The system may apply a probability match model to generate an overall match score for individual ones of the initial candidate matching entities, then may generate a response to the entity search query that includes information regarding one or more of the initial candidate matching entities with an overall match score exceeding a threshold.

19 Claims, 14 Drawing Sheets

Entity Matching Overview

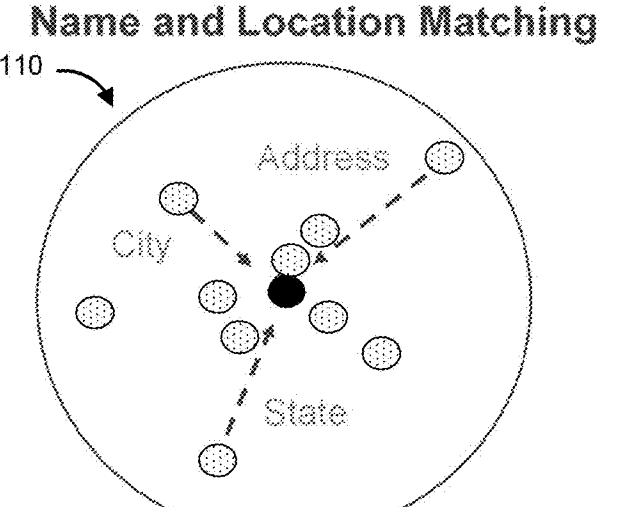

- Selects candidates based on fuzzy search match techniques
- Requires location information
- Lack of precise location data can yield many to one (1) search results

- Select candidates using name only based on fuzzy + indexing match techniques
- Does not require location information
- Reduce search space using corporate linkage, parent/child BIN relationships, and keep only high level entity information to reduce candidate list
- Probabilistic model to help separate very similar matches and predict which candidate has higher likelihood to be best match, reduces human intervention and remediation

FIGURE 1B

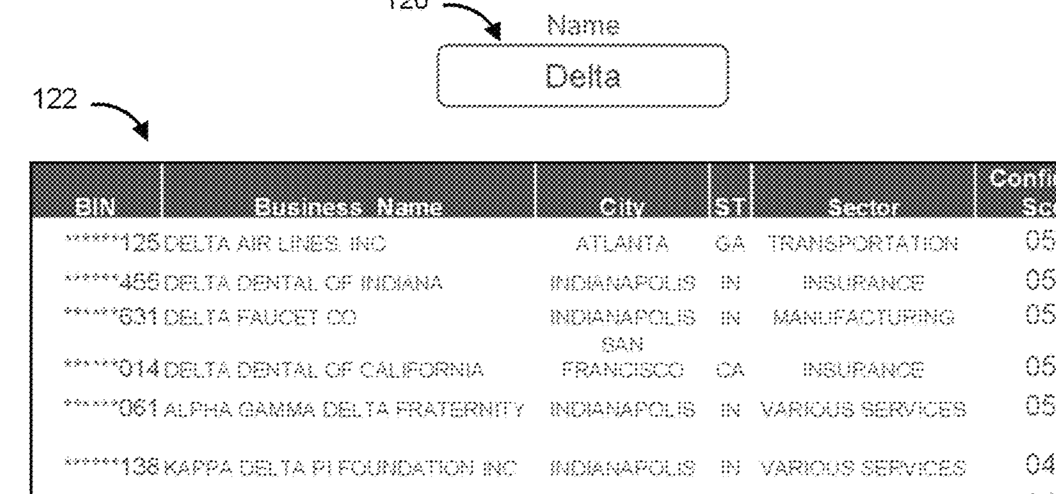

| BIN | Business Name | City | ST | Sector | Confidence Score |
|---|---|---|---|---|---|
| ******125 | DELTA AIR LINES, INC | ATLANTA | GA | TRANSPORTATION | 0598 |
| ******465 | DELTA DENTAL OF INDIANA | INDIANAPOLIS | IN | INSURANCE | 0595 |
| ******631 | DELTA FAUCET CO | INDIANAPOLIS | IN | MANUFACTURING | 0591 |
| ******014 | DELTA DENTAL OF CALIFORNIA | SAN FRANCISCO | CA | INSURANCE | 0527 |
| ******061 | ALPHA GAMMA DELTA FRATERNITY | INDIANAPOLIS | IN | VARIOUS SERVICES | 0516 |
| ******138 | KAPPA DELTA PI FOUNDATION INC | INDIANAPOLIS | IN | VARIOUS SERVICES | 0475 |
| ******206 | ALPHA XI DELTA BUILDING ASS. | LINCOLN | NE | VARIOUS SERVICES | 0452 |

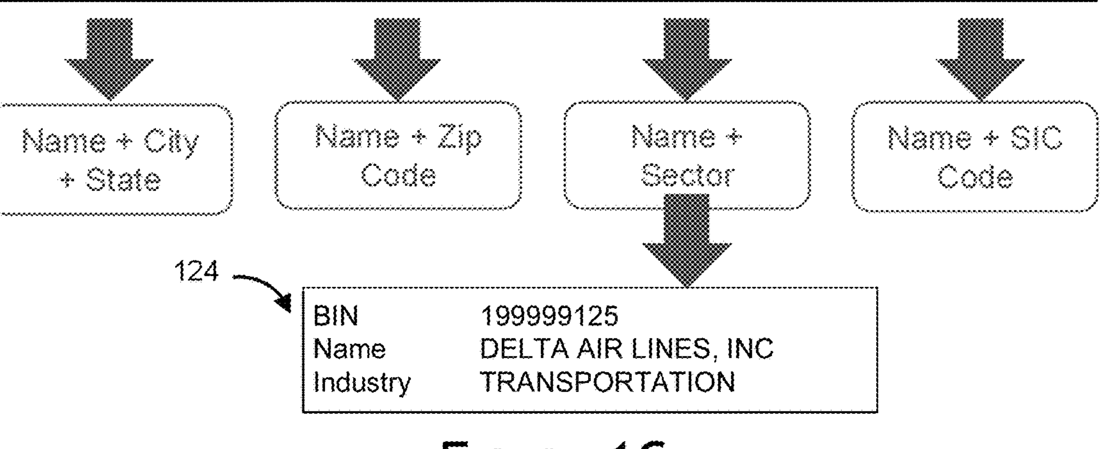

FIGURE 1C

Methodology

Entity Resolution Flow Chart (Part 1)

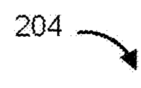
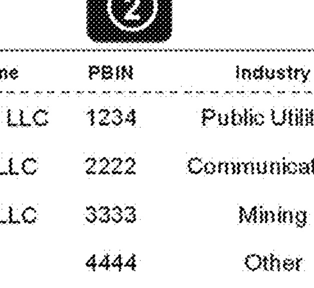
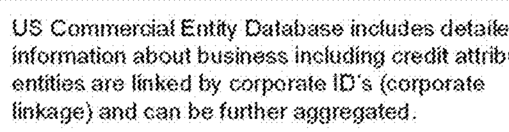

- Entity Resolution (ER) does not require more than a Business Name as input
- Optional input: Employer Name, Demand Deposit Account transaction/merchant description, Credit Card transaction/merchant description, Prospect Marketing List

| Business Name | PBIN | Industry | State |
|---|---|---|---|
| AWERA TECH LLC | 1234 | Public Utilities | NY |
| AREA TECH LLC | 2222 | Communications | GA |
| AREA TECH LLC | 3333 | Mining | CA |
| AWERA | 4444 | Other | OK |
| AREA TECH LLC | 2222 | Communications | IL |
| ... | ... | ... | ... |

- US Commercial Entity Database includes detailed information about business including credit attributes, entities are linked by corporate ID's (corporate linkage) and can be further aggregated.
- 148 candidates are returned based on initial string matching (fuzzy string matching)
- Candidate list includes possible location variations, which are further collapsed to the Entity-level (PBIN = 2222). This aggregation process significantly reduces the number of candidates remaining by removing location variations in the candidate list.

| Business Name | PBIN | Industry | State |
|---|---|---|---|
| AWERA TECH LLC | 1234 | Public Utilities | NY |
| AREA TECH LLC | 2222 | Communications | GA |
| AREA TECH LLC | 3333 | Mining | CA |
| AWERA | 4444 | Other | OK |
| ... | ... | ... | ... |

- Each candidate gets scored through a series of string matching and fuzzy matching algorithms with match similarity scores that compares various aspects of the input string and each candidate string
- Because matching keys are limited, the system may require high fuzzy match scores to consider a candidate
- Customizable name matching score model to account for factors such as the uniqueness of input name, client query pattern and characteristics of the candidate list

FIGURE 2A

Methodology

Entity Resolution Flow Chart (Part 2)

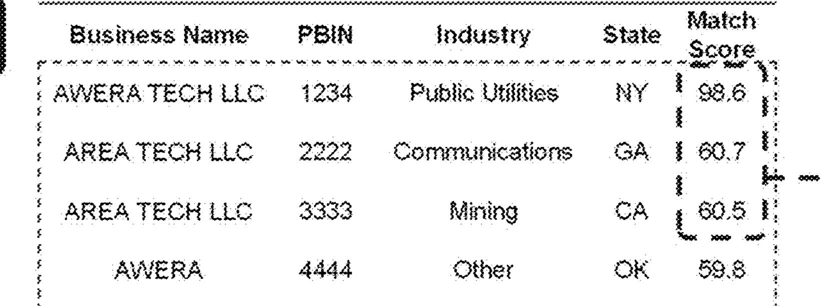

| Business Name | PBIN | Industry | State | Match Score |
|---|---|---|---|---|
| AWERA TECH LLC | 1234 | Public Utilities | NY | 98.6 |
| AREA TECH LLC | 2222 | Communications | GA | 60.7 |
| AREA TECH LLC | 3333 | Mining | CA | 60.5 |
| AWERA | 4444 | Other | OK | 59.8 |
| ... | ... | ... | ... | |

- Predictive model that predicts which candidate might be the best match based on the attributes related to that candidate. This may include the industry, credit attributes, firmographic details, name match scores, past queries, and linkage information, etc.
- A purpose of the probability match model is to separate entities that have the same or very similar names. These could be the same business, but for some reason, they are treated as separate entities in the commercial database. This method helps create slight separations in the final Match Score to provide the match that has more data associated with it.
- One embodiment: candidates above 60 Match Score cutoff returned
- Lower match scores may trigger iterative process to request additional information, even non-traditional matching keys since database has a long append of connected information to each candidate.

- System operator can create custom configuration files, which are models that can be customized to each client's portfolio distribution. System can train models that favor that client's specific mix of businesses that they interact with. Otherwise, it will default to the generic model.
- Based on information of client making the Entity Resolution query, system can determine which configuration file to use
- This method allows system to further reduce the candidate universe and improve the accuracy of matches.

FIGURE 2B

Corporate Linkage Structure via Graph

- Graph generated using three levels of BIN
- A large connected component for "EXPERIAN"
- Name/Address/Sector of all the nodes can be used to grow the entity

| Parent BIN | Subsidiaries |
|---|---|
| ****** 1677 | EXPERIAN HEALTH |
| ****** 4203 | EXPERIAN INFORMATION SOLUTIONS |
| ****** 8504 | EXPERIAN MARKETING SOLUTIONS |
| ****** 4266 | EXPERIAN SERVICES CORP |

602

604

SYSTEMS AND METHODS FOR ENTITY RESOLUTION

PRIORITY AND INCORPORATION BY REFERENCE

This application is a continuation of U.S. patent application Ser. No. 17/703,909, filed Mar. 24, 2022, which claims benefit of U.S. Provisional Patent Application No. 63/166,841, entitled "SYSTEMS AND METHODS FOR ENTITY RESOLUTION," filed Mar. 26, 2021, each of which are hereby incorporated by reference in their entirety.

BACKGROUND

There are a very large number of operating businesses in any given country (many millions in the United States alone). If a party is interested in researching a business, it is often difficult to narrow down results to a specific business entity of interest unless the party has precise identity information regarding the business entity of interest (such as a unique identification number, or a combination of the full legal name of the business entity and its full address). If a given party or user interested in researching or retrieving information regarding a target business entity only enters a partial name of the business entity when searching (such as a shortened version of the official legal name of the entity, as may be used in marketing materials or colloquially in the industry), it would not be uncommon for over one hundred potential entity matches to exist based on the entered name alone.

BRIEF DESCRIPTION OF THE DRAWINGS

Specific embodiments will be described with reference to the following drawings:

FIGS. 1A and 1B are visual representations contrasting entity matching processes with and without entity location information provided in the search request.

FIG. 1C visually depicts examples of a waterfall approach to entity matching with only a partial entity name provided as search criteria.

FIGS. 2A, 2B and 2C provide an example data flow for entity resolution, according to some embodiments.

DETAILED DESCRIPTION

Figure 1A:
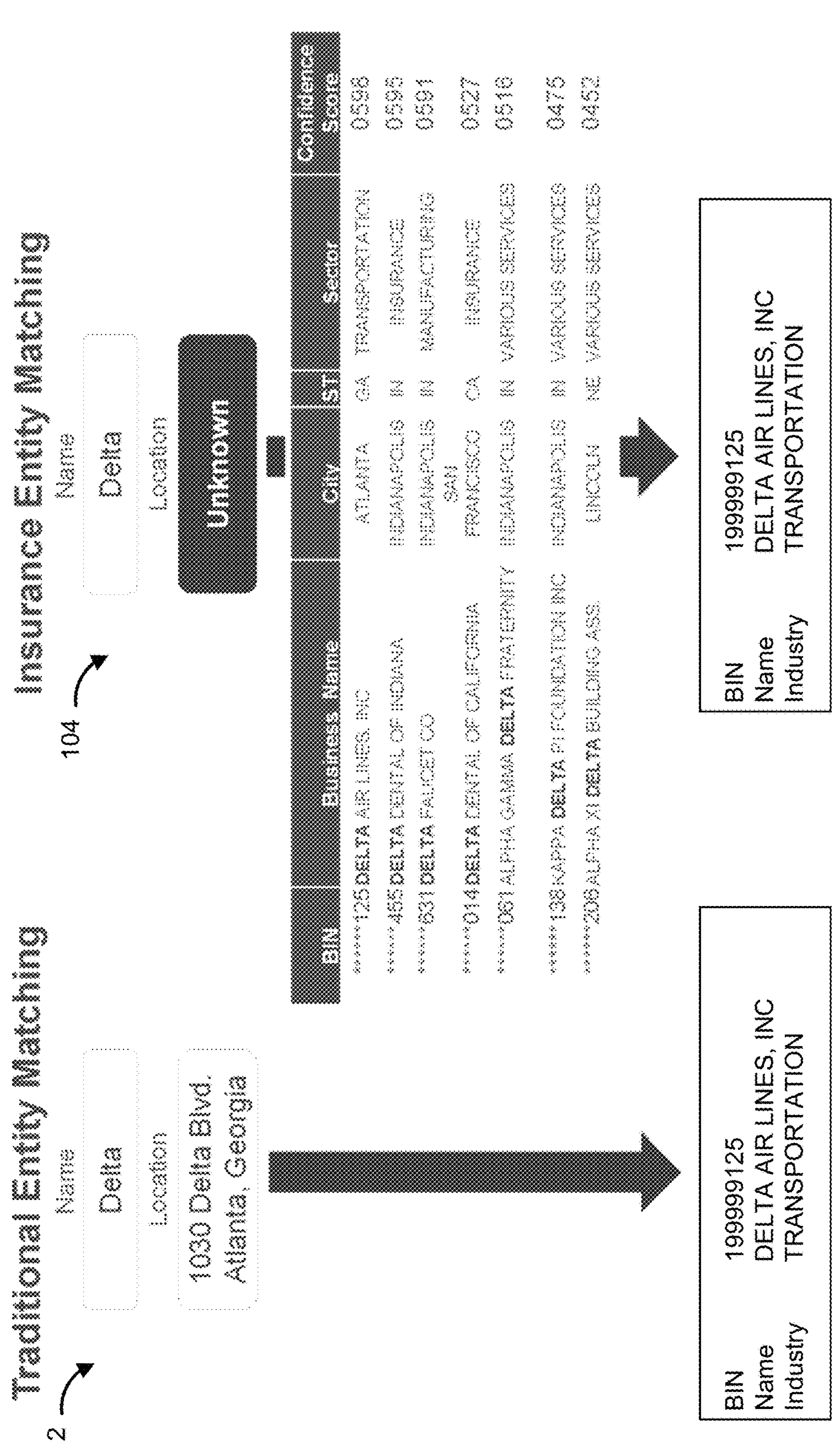

Generally described, aspects of the present disclosure relate to systems and methods for identifying a target business entity that a user intends to refer to based on input that may include as little as only a partial name of the entity. This may be particularly useful, among other uses, in the commercial insurance industry, where underwriters may work with brokers in a manner where the full business entity information for the entity to be insured is not communicated or passed between all of the parties. For example, an insurance application/quote/bind process often begins with submission of just a business name. Business name variations and inaccuracies make it difficult to discern a specific business confidently. Frequently, according to existing systems, insurers (or reinsurers) require human intervention to manually lookup business information, often leading to inaccuracies.

In many instances, for example, a number of underwriters may need to quickly view various information regarding a business (such as business facts information, among other data) to make an underwriting decision. However, these underwriters or other individuals may only have the business's name readily available (e.g., the person may know the company by its common name and be familiar with the company, but not have immediate access to a unique business identification number, an address, or other information that would enable a quick lookup of a more detailed profile of the company, as may be available through public sources, third party sources, and/or an internal database of the underwriter's own systems). Aspects of the present disclosure provide an Entity Resolution (ER) tool designed to accurately identify a business with only a name or partial name provided by a user. The methods disclosed herein enable insurers or other users to confidently standardize and unify business records in their portfolio using ER and resulting Business Identification Number (BIN) information.

The ER tool and system described herein may support insurers and reinsurers, among other use cases. This tool accurately matches a query to a business using only the business name as an input, though additional information may optionally be provided by the user to improve results. Existing business matching tools typically require at least a name and address. Using name only, methods described herein include searching for all candidates in large business databases (which may be reduced and organized at the entity level), algorithmically filtering based on likelihood of individual entities to be insurable or seeking insurance, and resolving the search to the most probable matching entity. These and other methods described herein provide insurers an accurate approach to matching regardless of policy source, resulting in a standardized name and corresponding BIN.

While insurance use cases are often used as an example herein, it will be appreciated that there are many other instances in which the entity matching features described herein may be utilized. As some examples, other uses may include: standardizing self-reported employment data to indicate the correct company where an individual works after the individual provides only an entity name or partial entity name; determining the company subject to a credit card transaction based on the merchant name indicated in credit card transaction data; and standardizing company names on a supplier list, customer list, and/or marketing prospect list.

The volume of businesses and their possible name variations require sophisticated modeling as well as broad and deep data sources to resolve to a business entity. The ER processes described herein may begin by finding all businesses with similar names in a business records database.

The ER system may then examine the underlying characteristics associated with each candidate's BIN to enhance the accuracy and reliability of the name-only matching results. Finally, when used in the insurance context, the ultimate matching business may be identified based upon which of the businesses is most likely to appear in an insurance portfolio (such as based on the specific requesting entity and/or their industry specializations). For example, the system may leverage one or more custom built individual models to assist in this prediction. A custom model may employ a similar approach to an existing (client agnostic) model to look for a best match, but the customized version may be designed and/or trained for each individual insurer's biases (or other client's biases in use cases outside of insurance).

For even greater accuracy in selecting the correct business, the ER system can include additional non-traditional query information or use a higher probabilistic score threshold to increase the accuracy of the match. For example, when the name of a business is accompanied by its industry segment, matching confidence has been seen to increase to 90%, and supplementing both industry and State location increased the match confidence to 95%. Similarly, at elevated score thresholds in the same evaluations, the ER approaches herein demonstrated 93-95% accuracy while maintaining high coverage. The simplicity of using any additional information available may effectively become a filtering step to reduce the candidate list rather than requirement as a search key, according to some embodiments.

The ER approaches herein deliver accurate results to insurers with varying or inconsistent business matching approaches. For insurers or reinsurers with multiple companies, lines, or systems that don't easily communicate, ER can be used to generate a master policy list with the resulting BIN. An immediate impact of knowing the BIN is the ability to then augment the policy that previously only had the business name with additional firmographic information including the address, industry codes such as SIC or NAICS, tax ID, and/or URL. The BIN and additional data can be used to query one or more application programming interfaces (APIs) or to supplement matching methods for data enrichment. Improved matching streamlines submissions processes by eliminating costly errors or manual lookups. It can also expose hidden relationships and unknown parent/child linkages among insured companies. Cross-sell opportunities, redundancies or even potential fraud can be identified if one has multiple policies covering the same entities.

Portfolio management and underwriting require accurate identification of a business entity along with all its associated businesses. Features described herein can accurately achieve this with minimal information. The system allows insurers or reinsurers to standardize and unify internal portfolio data, as well as confidently match new records to quickly create a single customer view with only a business name as a search input, in some embodiments. Once a specific business is identified, the system can return a standardized business name and the corresponding unique BIN, which can then be used to access hundreds of data elements on that business.

The terminology used in the description presented herein is not intended to be interpreted in any limited or restrictive manner, simply because it is being utilized in conjunction with a detailed description of certain specific embodiments. Furthermore, embodiments may include several novel features, no single one of which is solely responsible for its desirable attributes or which is essential to practicing the systems and methods described herein.

FIGS. 1A and 1B are visual representations contrasting entity matching processes with and without entity location information provided in the search request. As mentioned above, a challenging problem in commercial insurance is to identify an entity with only a business name and without any additional context. In typical matching systems, the inquirer seeking business verification typically provides both name and location for better accuracy. This is illustrated in flow overview 102 of FIG. 1A, in which a user provides both an entity name and full address of the entity in order for a system to resolve the request to a given BIN using relatively simple matching techniques. Alternatively, if the inquirer only provides the business name, as in flow 104 of FIG. 1A, it is possible that they want to broadly identify the corporate entity without precise location resolution. Existing matching systems cannot automatically discover a company and the location correctly without additional context.

However, systems described herein can reduce the search space and simplify the match process in a manner that still results in the correct BIN from among a potentially large set of potential matches (e.g., as shown in the table in FIG. 1A illustrating various BINs having business names that include the searched string). With respect to flow overview 104 in FIG. 1A, there may be over eight hundred candidates generated from the "Delta" query initially. The system may reduce candidates by leveraging unique BINs to dedupe. The system may then generate model attributes from credit attributes and/or firmographics data, as will be described further below. The system's final selection may be based on a combination of scores and optionally input from an underwriter or other user of the system (e.g., an entity or person submitting the query).

Referring to FIG. 1B, overview 110 depicts aspects of a traditional name and location matching process. As illustrated in overview 110, these traditional search techniques of existing systems may require location information for the business being searched, such that the lack of precise location data can yield many-to-one search results that are not desired. In contrast, the name only matching described herein may, as depicted in overview 112, use name only as input without requiring location information. The system may then reduce the search space using corporate linkage and parent/child BIN relationships, and keep only high level entity information to reduce the candidate list, according to some embodiments. A probabilistic model may also be employed to help separate very similar matches and predict which candidate has a higher likelihood to be the best match, which reduces human intervention and remediation.

FIG. 1C visually depicts examples of a waterfall approach to entity matching with only a partial entity name provided as search criteria. A waterfall approach may be applied by the system to resolve challenging entity name queries and improve match confidence. The system may leverage additional data to help with particularly difficult match cases. As illustrated, the system may leverage additional data fields to help resolve the correct business entity match for the search query 120 ("Delta"). In this embodiment, if the entity's city, state, sector and/or other relevant information is unavailable, the system can provide a list of probabilistic candidates 122. Alternatively or additionally, the system can then take a waterfall approach and apply best matching techniques to whatever fields are available in order to arrive at a best match 124. These and other approaches will be further described below.

Figure 2C:
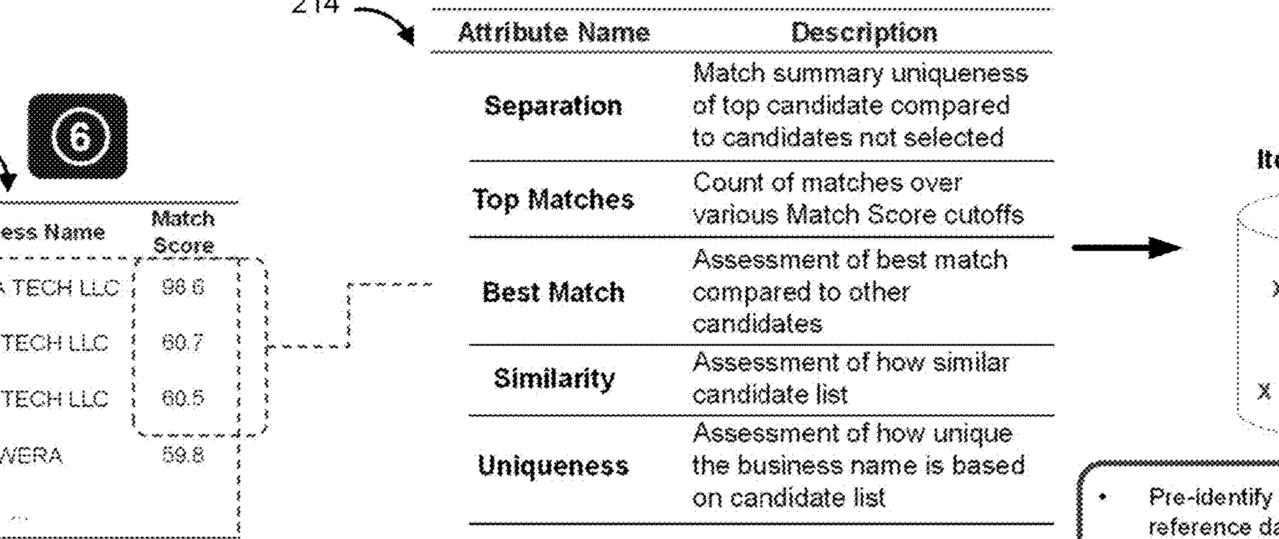

FIGS. 2A, 2B and 2C provide an example data flow for entity resolution, according to some embodiments. As illustrated in step (1) of FIG. 2A, the system may receive a query 202 that includes an entity name of the entity of interest to the user (in this case, "Awera Tech LLC"). As further illustrated, the user may optionally provide additional criteria if desired. At step (2), initial candidate results 204 may be determined by the system. These results may be determined from a database of commercial entity information, which includes detailed information about businesses including credit attributes, where entities may be linked by corporate ID's (corporate linkage) and can be further aggregated. A fuzzy matching algorithm may be employed for determining this candidate list. The candidate list may include possible location variations, which are further collapsed to the entity level (a parent BIN, "PBIN," equal to 2222 in this example). This aggregation process significantly reduces the number of candidates remaining by removing location variations in the candidate list.

Next, at step (3) of FIG. 2A, the system may generate, for each candidate, a match score through a series of two or more string matching and fuzzy matching algorithms. These match similarity scores generated by these algorithms may be based at least in part on comparing various aspects of the input string and each candidate string (business name) in various manners, which may include known string matching techniques. The scoring model may be customizable to account for factors such as the uniqueness of input name, client query patterns, and/or characteristics of the candidate list. As will be appreciated by one of ordinary skill in the art, fuzzy matching algorithms may also be referred to as approximate string matching algorithms, many of which are known and may be used in different embodiments of the present disclosure. For example, fuzzy string matching algorithms may rely on Levenshtein distance or edit distance between strings to determine the extent of similarity.

The method of FIG. 2A continues to step (4) illustrated in FIG. 2B, where the system applies a predictive model to generate match scores for each candidate entity 208. The predictive model may be trained to predict which candidate might be the best match based on the attributes related to that candidate. This may include the industry, credit attributes, firmographic details, name match scores, past queries, and linkage information, among other data. A purpose of the probability match model is to separate entities that have the same or very similar names. These could be the same business, but for some reason, they have been treated as separate entities in the commercial database. This method helps create slight separations in the final match score to provide the match that has more data associated with it. The match score determined at this step (4) may take into account the previous string matching scoring that may have been performed at step (3) above.

Once the match scores are generated, a match score cutoff may be applied to remove low scoring candidate entities. In one embodiment, candidates above a 60 match score are returned (e.g., via an API or displayed in a user interface). If only relatively lower match scores are generated, the system may trigger an iterative process to request additional information from the user, which may include data other than traditional matching keys since the entity database may include a long append of connected information to each candidate.

As mentioned in step (5) of FIG. 2B, a system operator can create custom configuration files, which are models that can be customized to each client's portfolio distribution. The system can train models that favor that client's specific mix of businesses that they interact with (for example, a given insurer may have a certain profile of companies that they typically insure). Otherwise, if no client-specific model has been trained, the system may default to a generic model (which may be specific to at least the industry of the client). This custom modeling allows the system to further reduce the candidate universe and improve the accuracy of matches.

The method of FIGS. 2A and 2B continues to step (6) illustrated in FIG. 2C, where the system may return (from among the entities listed in candidates 212) the top match or a list of top candidates above a threshold. The results may include the top score along with summary match descriptions that may provide additional confidence on match results. As illustrated, the system may consider attributes such as separation, top matches, best match, similarity, and/or uniqueness (as described in table 214). In some embodiments, strong match candidates can be used to further filter candidates in an iterative intelligence process, providing guidance to the user to submit clarifying information (e.g., industry, city, state, etc.) that can further clarify or separate candidate results intelligently and dynamically.

At step (7), the system may optionally apply iterative intelligence processes to further improve the entity resolution results. For example, the system may pre-identify areas of collision within a reference database to determine similar or identical business names ("common" names) and identify unique elements that could differentiate these collisions using name only. As another example, the system may use pre-calculated findings to prompt feedback and use an iterative approach to find the best match, as mentioned above. The system may additionally proactively clean or correct the database entries, such as using a feedback loop based on the clarification process applied.

Pre-identifying areas of collision in a database of company information may include, prior to a particular search being submitted, the system proactively cleaning the database records, removing errors, and/or inspecting the database in a manner that identifies areas of deficiencies or strengths and adds indications of that additional context to the database. Subsequently, for example, a group of candidates in the database (which may logically be considered to be a neighborhood, cluster or other grouping) could be affected by a query, but the system having access to stored data indicating that the neighborhood (or cluster, grouping, etc.) exists and the proximity of those neighbors beforehand may in some instances change how a search, match, and/or data interaction process is considered and resolved.

The iterative intelligence and database enhancements implemented at step (7) may include graph-based record linkage and/or natural language processing, as described further below. With respect to graph-based record linkage, the system may apply efficient graph algorithms to discover connected components (such as entities) of all candidates based on existing corporate linkage data (e.g. as stored in a local or third-party database) and to evaluate intra-similarity within each entity. However existing linkage is not always complete. There are often singular node or smaller connected components representing the same entity of another disconnected entity. Using the similarity score of the entity resolution processes described above, the system may compute the connection strength of each pair inside the candidate list. Merging of the nodes and components may then be proposed if the connection strength is above a certain threshold, where the threshold may also be a learnable parameter from the data. Additional data sources such as business contact and employment information can also be used to propose corporate linkage. In this case, the connection strength can be improved by considering the overlap of owners and employees.

With respect to natural language processing (NLP), NLP may be utilized in connection with business name embedding. The system can apply NLP (such as using Transformer) to create vector representations of input business name strings such that the distance between similar names of the same entity is small. This may involve fine-tuning a pre-trained character level Transformer model (such as CharacterBert) on the system's (or other data source's) commercial database. These vector representations allow further development of models to predict potential conflicts in the database before executing the query and fast retrieval of candidates using approximate nearest neighbor search algorithms to enhance the ER system. In addition, the distance between a pair of embeddings can be directly used as the name matching score and connection length for the graph analysis, in some embodiments.

As additional information regarding steps described above (such as at step 5), according to some embodiments, given the candidates based on similarity alone, the system may apply an additional passive method using commercial credit and firmographics data attached to candidate records to predict the likelihood that a candidate belongs to a given client portfolio or to help the system distinguish similar candidates from each other. The developed model may be considered an Entity Resolve model and/or may be employed within the probability match model, according to some embodiments.

TABLE 1

Entity Resolve model features, according to some embodiments

| Variable (Model Feature) | Description |
|---|---|
| Total_Account_Balance | Total dollar balance for all trade lines on business |
| Recent_High_Credit | Highest single line credit |
| Combined_Account_Balance | Total dollar balance for all new and continuously reported trade lines |
| Number_of_Legal_Items | Number of legal items reported. Made up of federal, state and local tax liens, bankruptcies, collections and UCC filings |
| Estimated_Number_of_Employees | Estimated number of employees |
| Sector_woe | Risk variable built from the business sector |
| Estimated_Annual_Sales_Amount | Estimated annual sales amount |
| Combined_DBT | Days-Beyond-Terms score (DBT) for new and continuous trade lines |
| State_woe | Risk variable built from the business location (State) |
| Number_of_Derogatory_Legal_Items | A count of the number of federal, state and local tax liens, Bankruptcies and Judgments on the business |
| Lien_count | Count of original liens placed |
| Collection_count | Count of collection placed |

Table 1 above illustrates sample features for an ER model, in some embodiments. The feature importance or weight assigned to each feature by the model (as may be seen in Shapley values) may favor or relatively highly weight a Sector feature (e.g., the business sector or industry that the entity operates in, as converted into a risk variable) and/or one or more commercial credit attributes for the entity (such as the variables identified above as Number_of_Legal_Items, Recent_High_Credit, Combined_Account_Balance, etc.).

Figure 3:
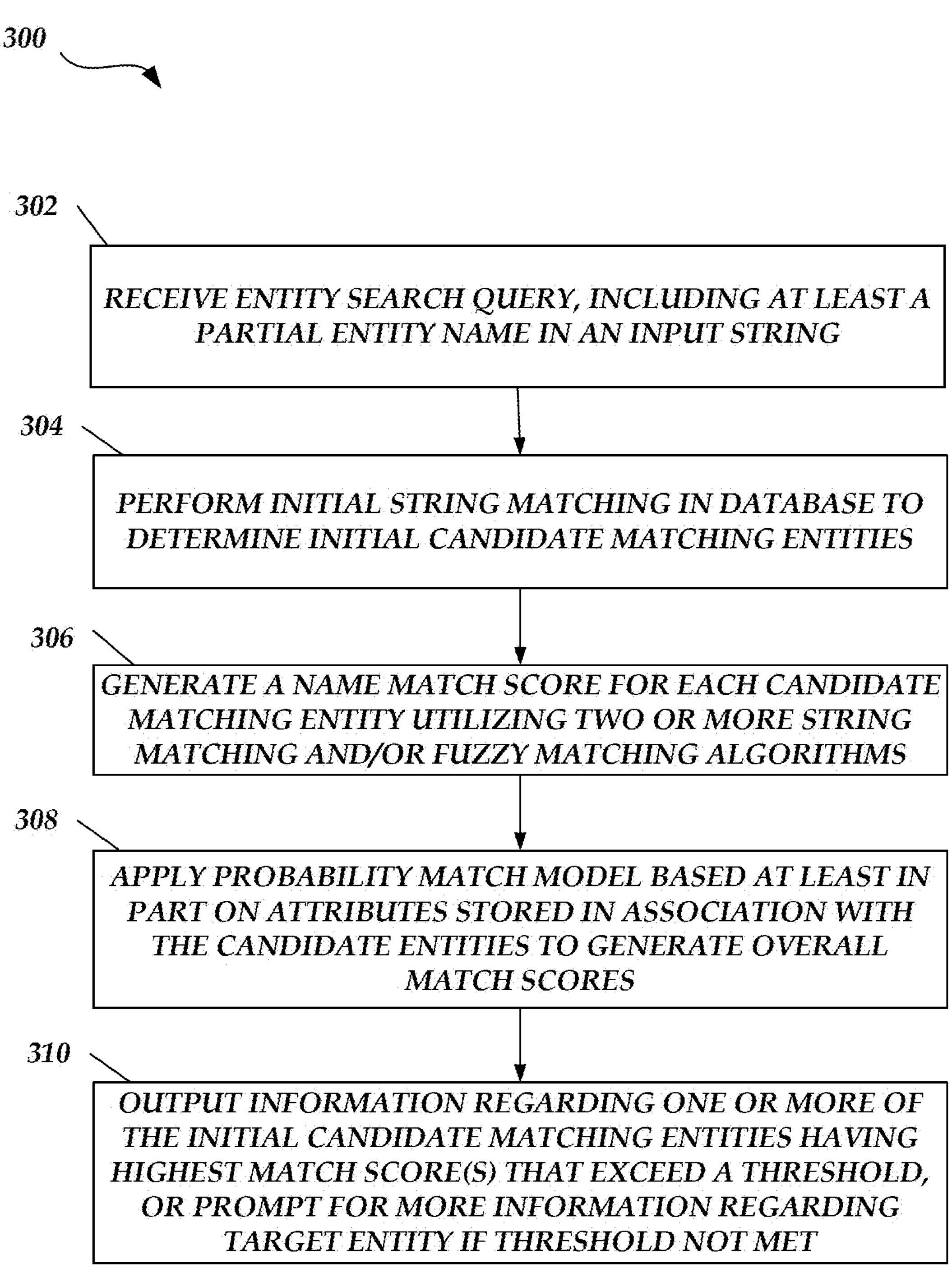
FIG. 3 is a flow chart of an illustrative process for entity resolution in response to a search query, according to some embodiments.

FIG. 3 is a flow chart of an illustrative process 300 for entity resolution in response to a search query, according to some embodiments. Process 300 largely follows the method described above with respect to FIGS. 2A, 2B and 2C, though shown in a different form, so the blocks will not be described in detail below.

First, at block 302, the system may receive a query that includes at least a partial business name. At block 304, the system may perform initial string matching between the input string and records in a commercial database to determine initial candidate matching entities, as was described previously above. Next, at block 306, the system may generate a name match score for each candidate matching entity relative to the input string, such as by utilizing two or more string matching and/or fuzzy matching algorithms, as described above.

At block 308, the system may apply a probability match model based at least in part on attributes stored in association with the candidate entities (e.g., industry, credit attributes, firmographic details, past queries, and/or linkage information, among others) to generate an overall match score for each candidate entity. This probability match model may also use the name match score determined in the prior block above as input. Though not illustrated in FIG. 3, the system may optionally implement additional features or steps to narrow the candidate list or improve relevance of the results, such as narrowing the search space based on the particular client, industry, or other information.

Lastly, at block 310, the system may output information regarding one or more entity candidates having a highest match score and/or a match score exceeding a threshold, or prompt for more information if the threshold is not met. The output may be in an API response to another system, or may be included as information to be displayed to the requesting user in a user interface.

Figure 4:
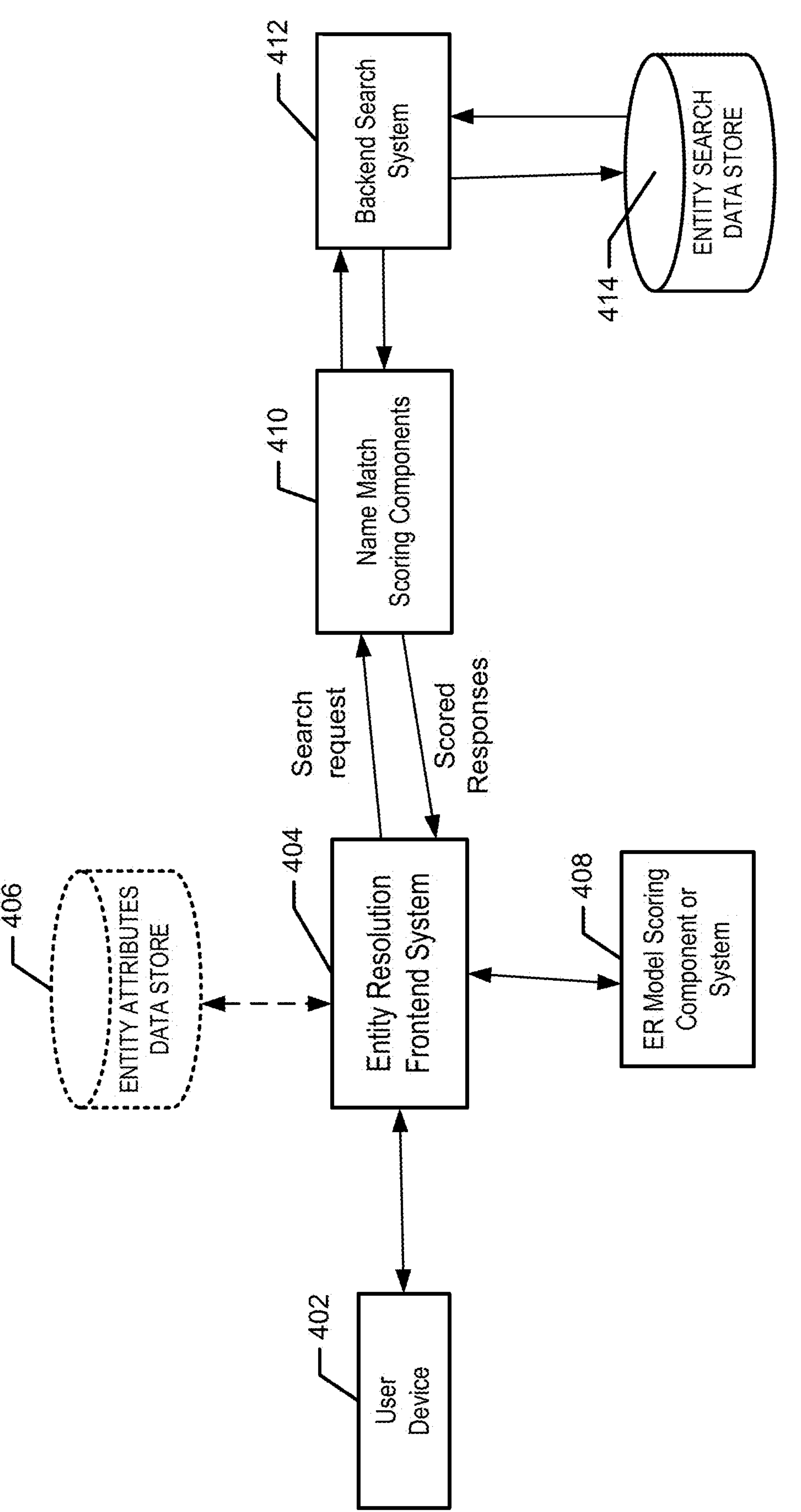
FIG. 4 depicts an illustrative operating environment for entity resolution, according to some embodiments.

FIG. 4 depicts an illustrative operating environment for entity resolution, according to some embodiments. The various devices, components and systems may be in local communication with one another, or may communicate over a network, such as the Internet. The user device 402, such as a computer, mobile phone, tablet device, or other computing device, may be utilized by a user who submits an entity search request to the entity resolution frontend system 404. The entity resolution frontend system 404 may be in communication with an entity attributes data store 406 that stores various detailed information regarding businesses (such as all or substantially all businesses operating in a given jurisdiction that meet certain size criteria or other criteria). In other embodiments, such business attributes data may be appended to entity search data store 414 in order to retrieve the attributes along with the query response from the backend search system 412. This alternative arrangement may eliminate any need for the system 404 to look up attributes separately (such as from the illustrated separate attributes data store 406) when scoring candidates through the ER model scoring component(s) 408.

Upon receiving a query from the user device, the ER frontend system 404 may send a corresponding search request to the name match scoring components (such as via an API call), which may in turn access a backend search system 412 configured to search the entity search data store 414 for the given entity name. In some embodiments, the backend search system 412 may be an existing system configured to typically respond to entity searches that include location criteria for the entity (whereas the search provided by the user to the ER frontend system 404 may not include such location information). The name match scoring components 410 may receive results from the backend search system 412 and apply name matching scoring models discussed above. The scored responses may be returned to the ER frontend system 404, which may then request additional scoring (such as using a probability model) from the ER model scoring component or system 408, such as using techniques described above with respect to steps 4-7 of FIGS. 2B and 2C. Final results for the query may be determined or gathered by the ER frontend system 404 and returned to the user device 402.

Figure 5:
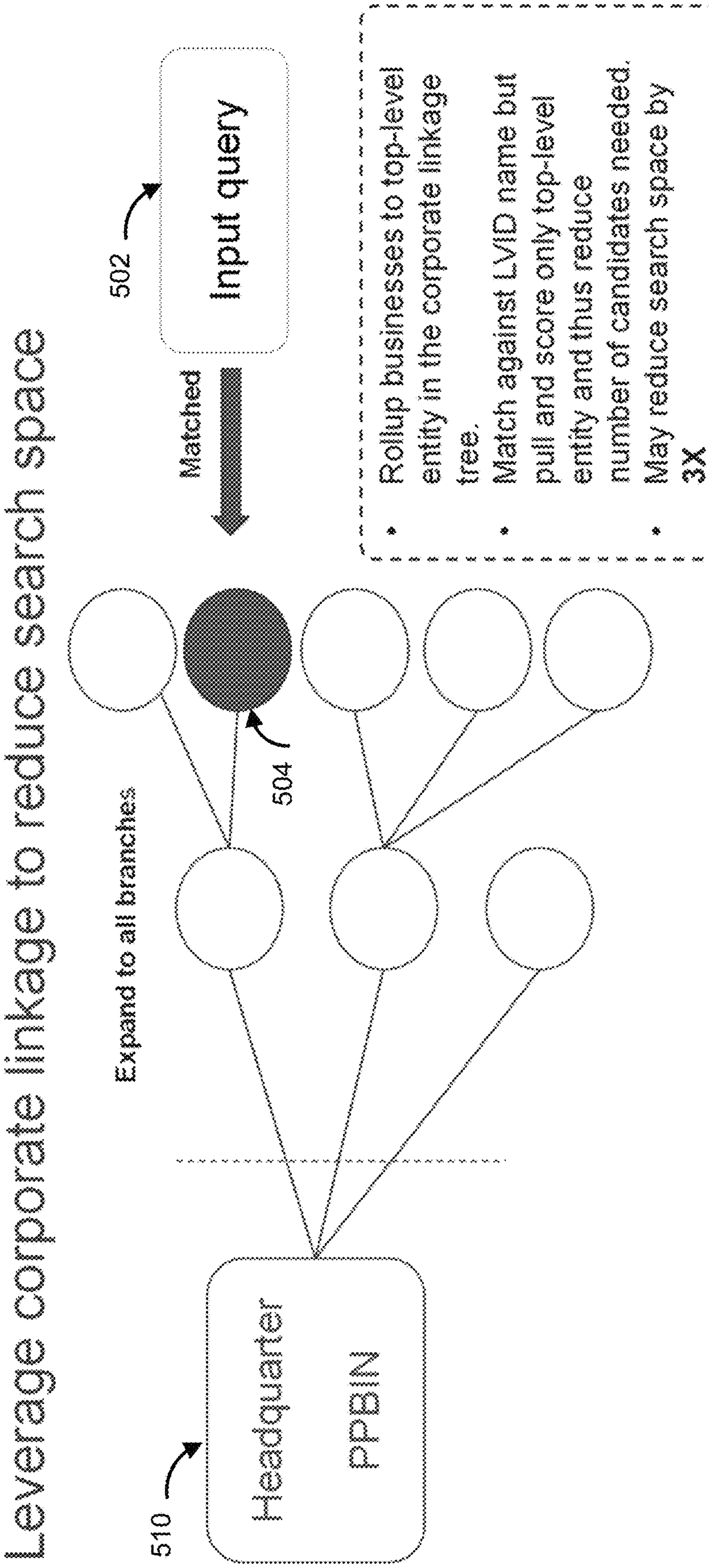
FIG. 5 graphically depicts a manner of performance optimization for entity resolution by leveraging corporate linkage.

FIG. 5 graphically depicts a manner of performance optimization for entity resolution by leveraging corporate linkage. As illustrated, an input query 502 may be matched by the system to a particular entity (such as a BIN) represented by node 504. The system may then rely on a corporate linkage tree to apply a rollup to a top-level business entity 510 in the tree or graph structure. This technique may reduce search space substantially.

Figure 6:
FIG. 6 depicts example corporate information and a corresponding corporate linkage graph structure.
Figure 6:
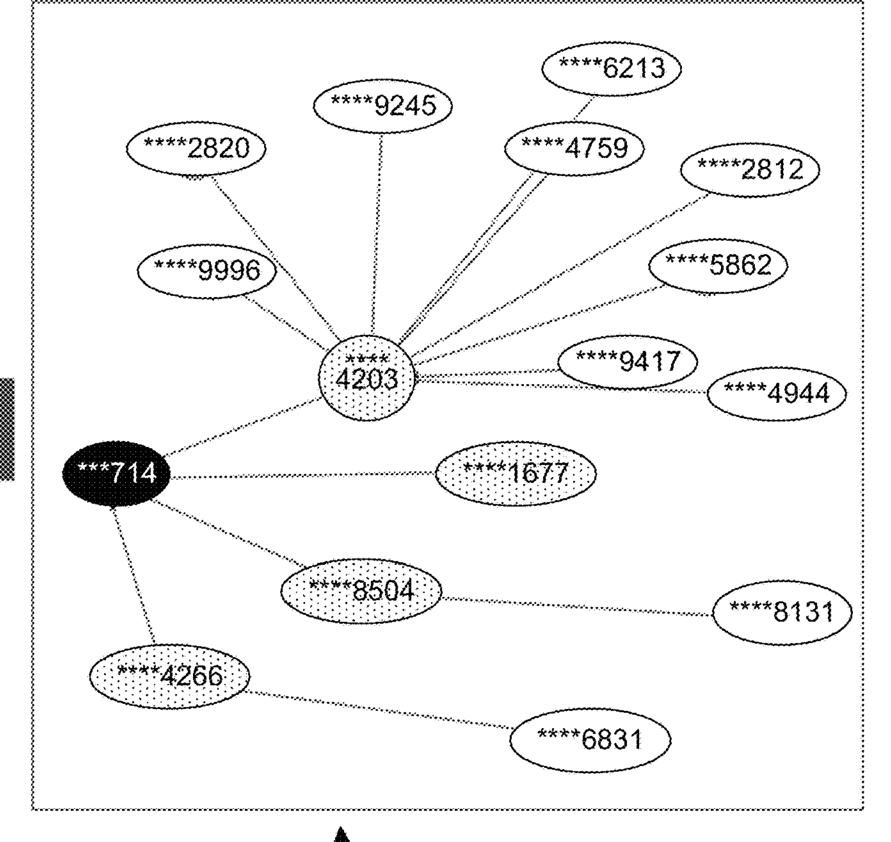

FIG. 6 depicts example corporate information 602 and a corresponding corporate linkage graph structure 604. As illustrated, the graph structure 604 has been generated by the system using three levels of BINs (designated as "ultimate BIN," "parent BIN," and "child BIN"), which may be visualized in a tree structure such as that shown in FIG. 5 described above. As shown in table 602, the various subsidiary entities all share a common word in their names ("Experian"), and may have been connected to one another based on attributes such as name, address, sector, and/or others having commonalities with one another.

Figure 7:
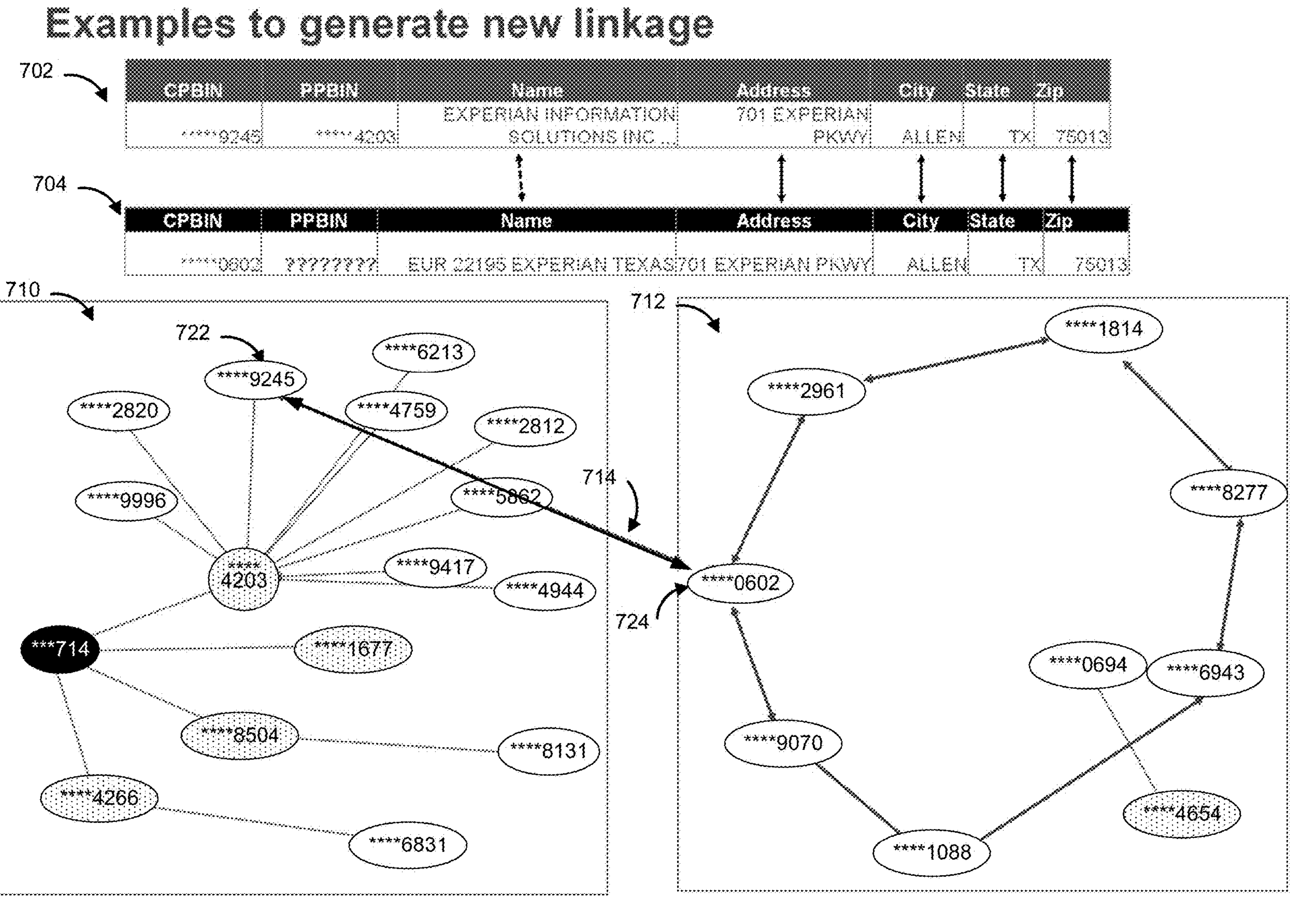
FIG. 7 graphically represents assigning new linkage between nodes in a corporate linkage graph structure.

FIG. 7 graphically represents assigning new linkage between nodes in a corporate linkage graph structure. As shown in tables 702 and 704, the two entities listed have many commonalities or linking keys (such as a partial matching name, and a matching address, city, state and zip code). In other embodiments, less closely matched entities may nonetheless be identified from their corporate attribute information. Based on the matching in tables 702 and 704, the system has stored a new link, edge or association 714 between node 722 (of subgraph 710) and node 724 (of subgraph 712), which represent the BINs of entity 702 and 704, respectively.

Figure 8:
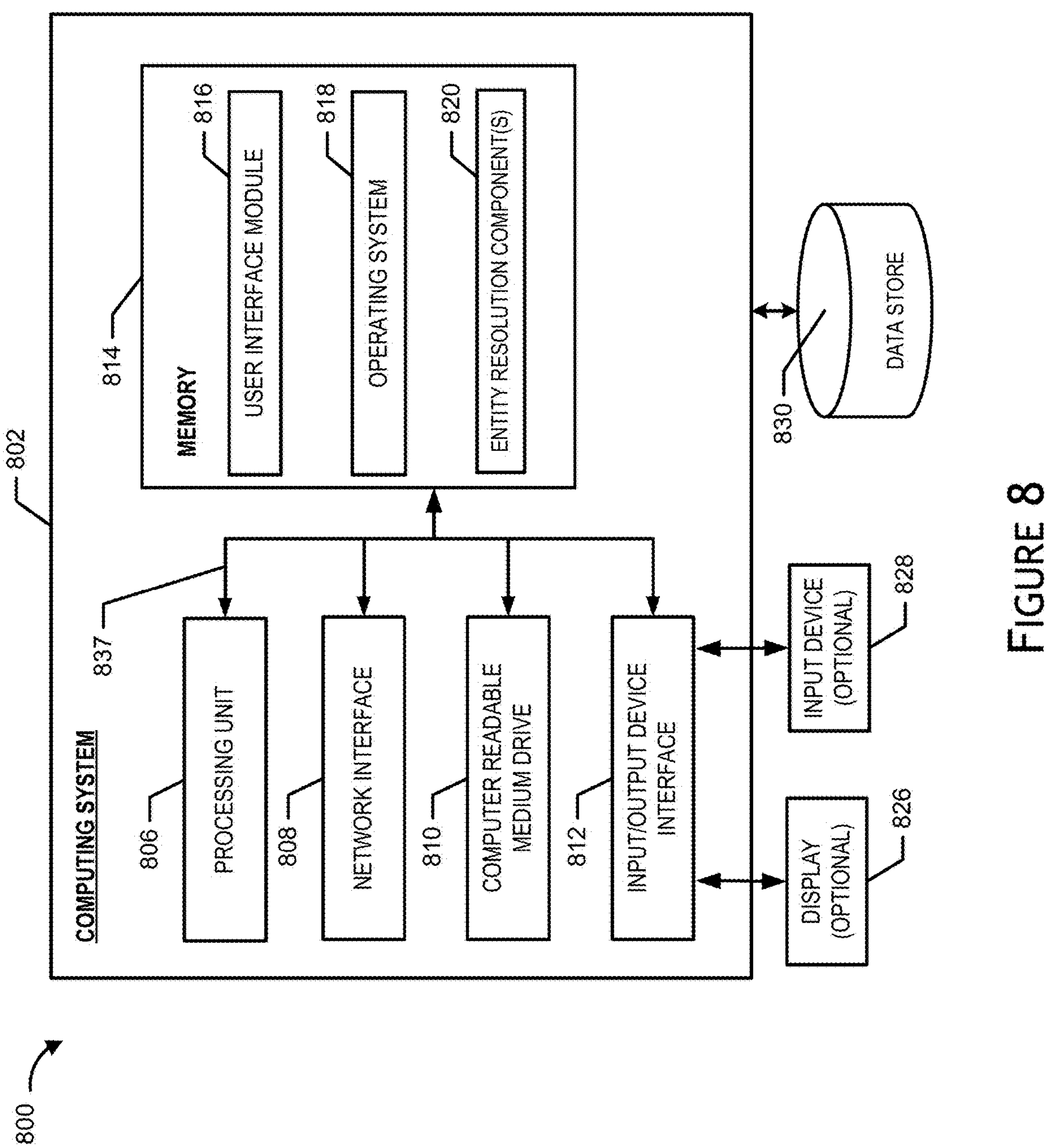
FIG. 8 illustrates a general architecture of a computing environment, according to some embodiments.

In some embodiments, the systems, computer clients and/or servers described herein take the form of a computing system as shown in FIG. 8. FIG. 8 illustrates a general architecture of a computing environment 800, according to some embodiments. As depicted in FIG. 8, the computing environment 800 may include a computing system 802. The general architecture of the computing system 802 may include an arrangement of computer hardware and software components used to implement aspects of the present disclosure. The computing system 802 may include many more (or fewer) elements than those shown in FIG. 8.

As illustrated, the computing system 802 includes a processing unit 806, a network interface 808, a computer readable medium drive 810, an input/output device interface 812, an optional display 826, and an optional input device 828, all of which may communicate with one another by way of a communication bus 837. The processing unit 806 may communicate to and from memory 814 and may provide output information for the optional display 826 via the input/output device interface 812. The input/output device interface 812 may also accept input from the optional input device 828, such as a keyboard, mouse, digital pen, microphone, touch screen, gesture recognition system, voice recognition system, or other input device known in the art.

The memory 814 may contain computer program instructions (grouped as modules or components in some embodiments) that the processing unit 806 may execute in order to implement one or more embodiments described herein. The memory 814 may generally include RAM, ROM and/or other persistent, auxiliary or non-transitory computer-readable media. The memory 814 may store an operating system 818 that provides computer program instructions for use by the processing unit 806 in the general administration and operation of the computing system 802. The memory 814 may further include computer program instructions and other information for implementing aspects of the present disclosure. For example, in one embodiment, the memory 814 may include a user interface module 816 that generates user interfaces (and/or instructions therefor) for display upon a computing system, e.g., via a navigation interface such as a browser or application installed on the computing system 802 or the client computing system 803.

In some embodiments, the memory 814 may include one or more entity resolution components 820, which may be executed by the processing unit 806 to perform operations according to various embodiments described herein. The components or modules 820 may access one or more data store 830 to store and/or retrieve data as described herein. The data store(s) may be part of the computing system 802, remote from the computing system 802, and/or may be a network-based service.

In some embodiments, the network interface 808 may provide connectivity to one or more networks or computing systems, and the processing unit 806 may receive information and instructions from other computing systems or services via one or more networks, such as the Internet. In particular, the computing system 802 may establish a communication link with a network (e.g., using known protocols) in order to send communications to another computing system over the network.

Those skilled in the art will recognize that the computing system 802 may be any of a number of computing systems including, but not limited to, a laptop, a personal computer, a mobile phone, a smartphone, a tablet computer, another wireless device, one or more servers, and the like.

Figure 9:
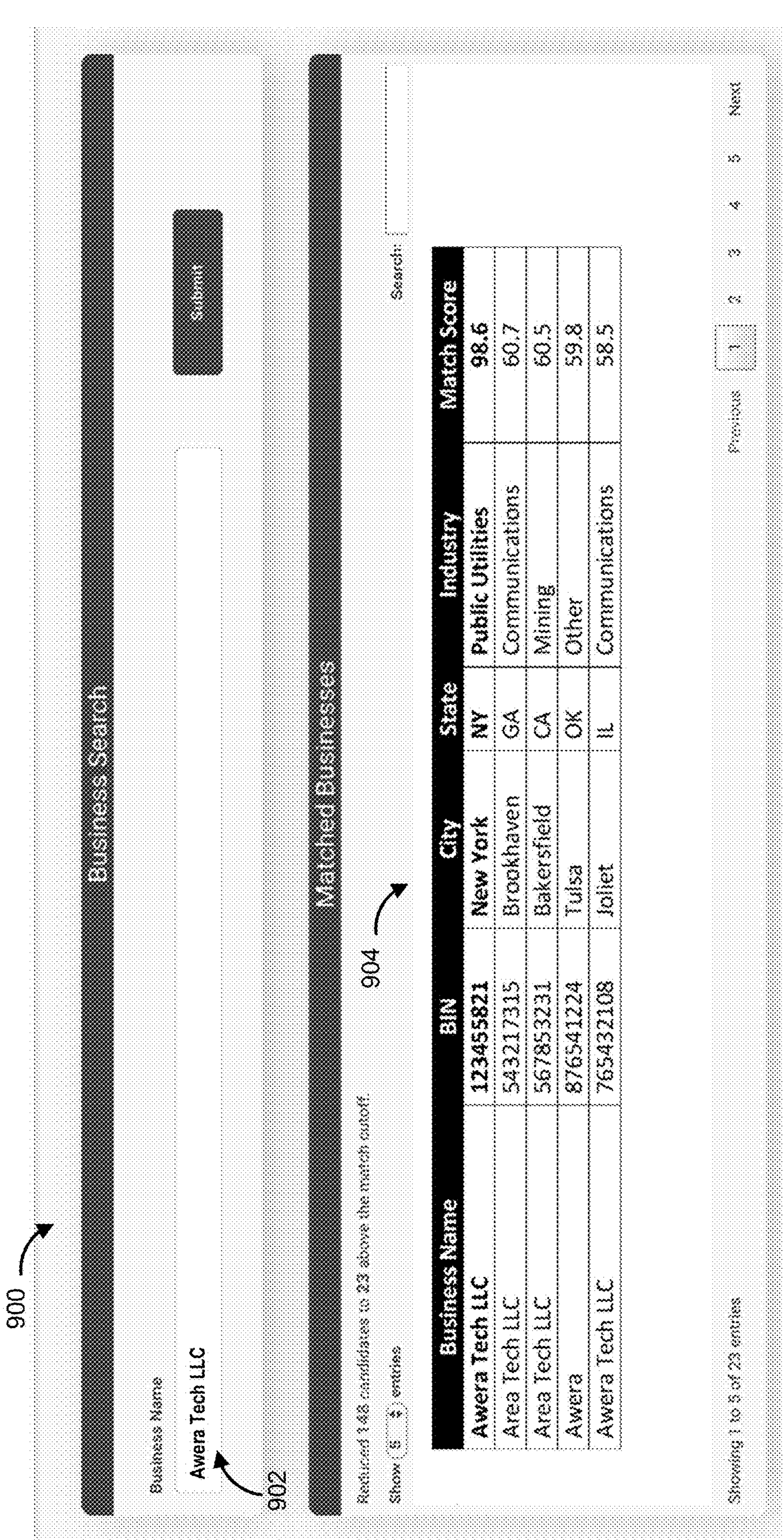
FIG. 9 is an illustrative user interface that may be presented to a user who wishes to search for information regarding a business entity by entering only the entity's name (or a portion thereof).

FIG. 9 is an illustrative user interface 900 that may be presented to a user who wishes to search for information regarding a business entity by entering only the entity's name (or a portion thereof). The user interface 900 may be presented, for example, by user device 402 based on user interface data (or API data responses) delivered over a network from entity resolution system 404. As illustrated, the user has entered an input string as the sole query information in field 902. The entity resolution system 404 has generated search results 904 that include 23 potential matches (reduced from 148 matches prior to applying candidate reduction improvements described above), of which the top four results are shown, along with their respective match scores, in descending match score order. While multiple matched entities are shown in sorted order (sorted by descending match score) in user interface 900, in other embodiments, the system may present a single best matching entity automatically in response to the user's submission of only a partial business name, such as in response to the system identifying a match with a sufficiently high match score (such as over a threshold of 98 out of a maximum 100, in one embodiment).

Figure 10:
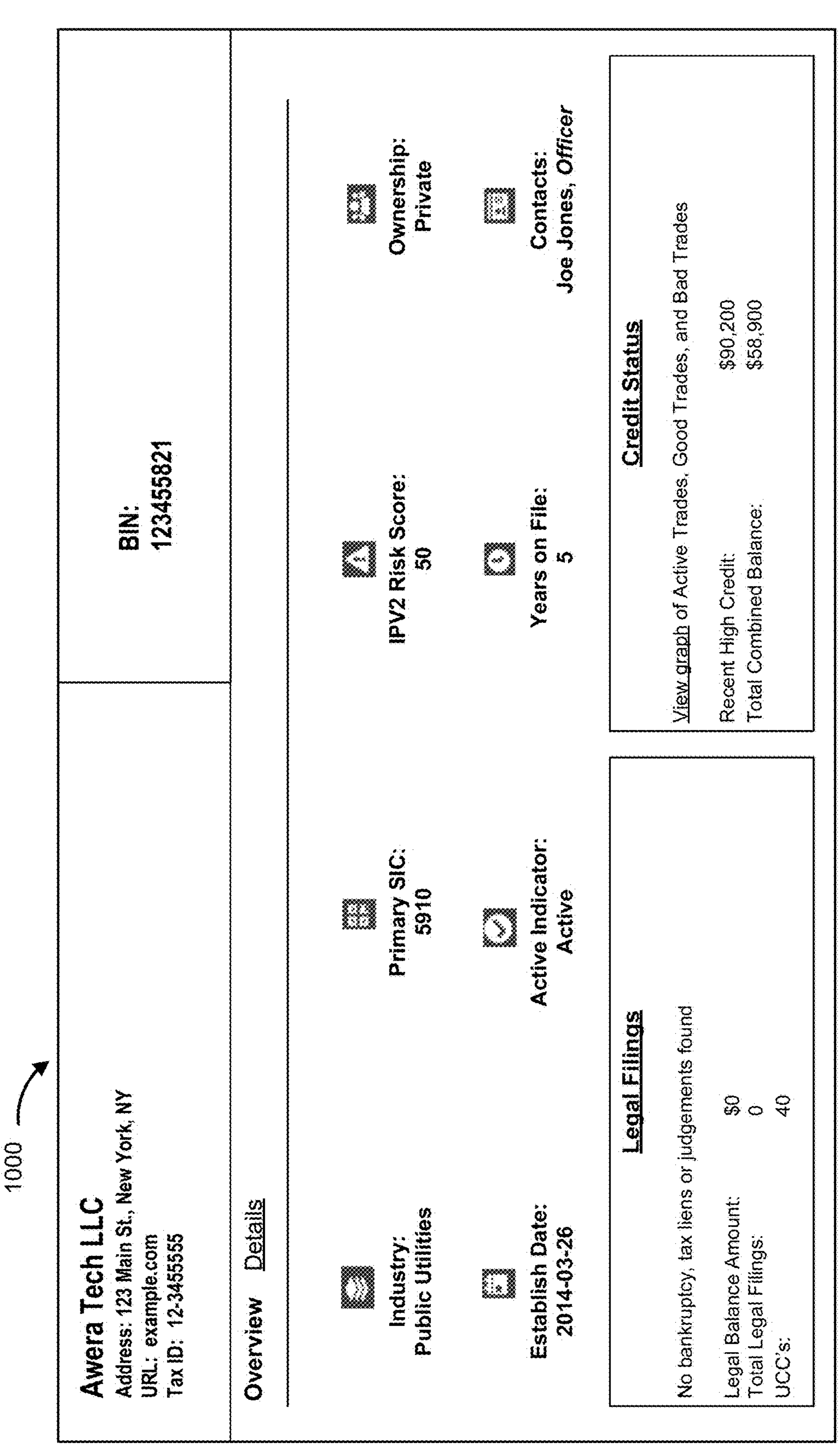
FIG. 10 is an illustrative user interface that presents various business information regarding a user-selected entity.

The user may select any of the entity matches displayed in the user interface 900 in order to be presented with various detailed information regarding the entity, such as that shown in user interface 1000 of FIG. 10. FIG. 10 is an illustrative user interface 1000 that presents various business information regarding a user-selected entity. In the illustrated example, the user is shown information such as the entity's industry, ownership information, risk information, contacts, legal filing information, credit status information, etc. It will be appreciated that a variety of other information may be presented once the methods described herein (in combination with any user input) have narrowed the entity search request to a specific, singular entity.

In some embodiments, the entity resolution system may rely on a number of APIs and/or data sources to append or enrich data provided in association with entity queries as described herein. In various embodiments, the APIs or other data sources accessed (and/or the data or information ultimately provided to a searching user) for a given entity may include one or more of the following, which be either internal or external to the system (and may be provided by the same operator as the entity resolution system, or by a third party): credit headers or other headers (such as business identity information); profiles from a commercial credit report database; business aggregates data (e.g., may represent over 400 unique data attributes that represent the building blocks of commercial credit); segment information, such as from one or more businesses API endpoints; risk dashboards (e.g., commercial and/or FSR scores, credit limit amount, current DBT, etc.); business facts (such as key operational facts including SIC, NAICS, public status, sales, employees, etc.); fraud shields (e.g., screens for potential indicators of fraud, including possible OFAC match); scores, such as commercial and/or and financial stability risk scores (which each may include a score, score factors, and/or monthly/quarterly trends); credit status (such as key credit facts about the business, including tradeline count, balance, DBT, etc.); legal filings and collections summaries; trade data (e.g., trade summary, payment experiences, payment totals, trade payment trends, etc.); bankruptcies, liens, and/or court judgments; UCC filings, such as via a summary and/or trends; corporate registrations (e.g., corporate registration information for the business, including filing status); and/or corporate linkage, which may include a partial or full family tree of related entities. Further APIs or other data sources accessed or data provided may include additional business contacts, such as individual owners, company owners, contacts and titles, contacts' business affiliations, etc.; reverse addresses, such as an API that allows input of an address to return businesses affiliated with that address; reverse phone number, such as an API that allows input of a phone number to return businesses affiliated with that phone number; reverse tax IDs, such as an API that allows input of a Tax ID (e.g., an EIN) to return businesses affiliated with that Tax ID; and/or government details, such as economic diversity status, CAGE code, debarred status, government contracts, and/or others.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more general purpose computers or processors. The code modules may be stored in any type of non-transitory computer-readable medium or other computer storage device. Some or all the methods may alternatively be embodied in specialized computer hardware. In addition, the components referred to herein may be implemented in hardware, software, firmware or a combination thereof.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm elements described in connection with the embodiments disclosed herein can be implemented as electronic hardware, computer software, or combinations of both. To clearly illustrate this interchangeability of hardware and software, various illustrative components, blocks, modules, and elements have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, or algorithm described in connection with the embodiments disclosed herein can be embodied directly in hardware, in a software module stored in one or more memory devices and executed by one or more processors, or in a combination of the two. A software module can reside in RAM memory, flash memory, ROM memory, EPROM memory, EEPROM memory, registers, hard disk, a removable disk, a CD ROM, or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

It should be emphasized that many variations and modifications may be made to the above-described embodiments, the elements of which are to be understood as being among other acceptable examples. All such modifications and variations are intended to be included herein within the scope of this disclosure.

What is claimed is:

1. A computer-implemented method comprising:

receiving an entity search query via user interaction with a user interface, the entity search query including an input string that includes a partial name of an entity for which a user would like to retrieve information, wherein the partial name does not uniquely identify the entity;

determining initial candidate matching entities by at least performing initial string matching relative to a plurality of stored entity records for a plurality of entities;

generating a name match score for each of the initial candidate matching entities relative to the input string, wherein generating the name match score for each of the initial candidate matching entities utilizes at least one of: a string matching approach or a fuzzy matching approach;

generating an overall match score for each of at least a subset of the initial candidate matching entities, wherein the overall match score for each individual candidate matching entity of the subset of the initial candidate matching entities is generated based at least in part on (a) the name match score for the individual candidate matching entity and (b) one or more attributes previously stored in association with the individual candidate matching entity; and generating a response to the entity search query, the response including information, for display in the user interface, regarding one or more of the initial candidate matching entities having an overall match score exceeding a threshold.

2. The computer-implemented method of claim 1 further comprising causing display, in the user interface in response to the entity search query, of an initial candidate matching entity having a highest overall match score, wherein the initial candidate matching entity having the highest overall match score is determined by the computing system without receiving any information from the user regarding the initial candidate matching entity other than the partial name.

3. The computer-implemented method of claim 1, wherein the one or more attributes comprise one or more of: an industry, credit attributes, firmographic details, past search queries, or entity linkage information.

4. The computer-implemented method of claim 1, wherein generating the name match score comprises a fuzzy matching approach that calculates an edit distance between an individual initial candidate matching entity and the input string.

5. The computer-implemented method of claim 1, wherein the user represents an insurer that is considering insuring the entity for which the user would like to retrieve information, the computer-implemented method further comprising applying a filter to the initial candidate matching entities based on a likelihood of each of the initial candidate matching entities to be seeking insurance.

6. The computer-implemented method of claim 1, wherein the response includes, for display in the user interface, a Business Identification Number (BIN) for at least one of the initial candidate matching entities having an overall match score exceeding the threshold.

7. The computer-implemented method of claim 1 further comprising, prior to generating the response, reducing an entity search space for the entity search query based on corporate linkage information that associates entities having a parent and child relationship.

8. A computing system comprising:

a non-transitory data store configured to store executable instructions; and one or more computer processors configured to execute the executable instructions, wherein execution of the executable instructions causes the one or more computer processors to:

receive an entity search query via user interaction with a user interface, the entity search query including an input string that includes a partial name of an entity for which a user would like to retrieve information, wherein the partial name does not uniquely identify the entity;

determine initial candidate matching entities by at least performing initial string matching relative to a plurality of stored entity records for a plurality of entities;

generate a name match score for each of the initial candidate matching entities relative to the input string, wherein generating the name match score for each of the initial candidate matching entities utilizes at least one of: string matching or fuzzy matching;

generate an overall match score for each of at least a subset of the initial candidate matching entities, wherein the overall match score for each individual candidate matching entity of the subset of the initial candidate matching entities is generated based at least in part on (a) the name match score for the individual candidate matching entity and (b) one or more attributes previously stored in association with the individual candidate matching entity; and generate a response to the entity search query, the response including information, for display in the user interface, regarding one or more of the initial candidate matching entities having an overall match score exceeding a threshold.

9. The computing system of claim 8, wherein execution of the executable instructions further causes the one or more computer processors to cause display, in the user interface in response to the entity search query, of an initial candidate matching entity having a highest overall match score, wherein the initial candidate matching entity having the highest overall match score is determined by the computing system without receiving any information from the user regarding the initial candidate matching entity other than the partial name.

10. The computing system of claim 8, wherein the entity search query does not include any geographical location information associated with the entity for which the user would like to retrieve information.

11. The computing system of claim 8, wherein execution of the executable instructions further causes the one or more computer processors to apply a client-specific model that scores the initial candidate matching entities based at least in part on attributes of entities that a client associated with the user has interacted with previously.

12. The computing system of claim 8, wherein execution of the executable instructions further causes the one or more computer processors to apply natural language processing (NLP) to create vector representations of a plurality of entity names such that a distance between two vector representations corresponds to an extent of similarity between respective entity names represented by the two vector representations.

13. The computing system of claim 8, wherein the overall match score is based at least in part on graph-based record linkage data whereby nodes representing entities having a corporate relationship are connected in a graph structure.

14. The computing system of claim 13, wherein execution of the executable instructions further causes the one or more computer processors to apply a rollup operation to a top-level entity node in the graph structure with respect to a connected node.

15. The computing system of claim 8, wherein the overall match score for an individual candidate matching entity is based at least in part on one or more query patterns associated with search queries previously submitted by the user.

16. The computing system of claim 8, wherein the overall match score for an individual candidate matching entity is based at least in part on how unique an individual entity name is relative to entity names of the initial candidate matching entities.

17. The computing system of claim 8, wherein the response includes, for display in the user interface, a Business Identification Number (BIN) for at least one of the initial candidate matching entities having an overall match score exceeding the threshold.

18. The computing system of claim 8, wherein generating the name match score comprises a fuzzy matching approach that calculates an edit distance between an individual initial candidate matching entity and the input string.

19. The computing system of claim 8, wherein the user represents an insurer that is considering insuring the entity for which the user would like to retrieve information, wherein execution of the executable instructions further causes the one or more computer processors to apply a filter to the initial candidate matching entities based on a likelihood of each of the initial candidate matching entities to be seeking insurance.

* * * * *